Dec. 18, 1928.
L. A. GROLEMUND
1,695,547
DRAWING SHEET GLASS
Filed June 18, 1923     3 Sheets-Sheet 1
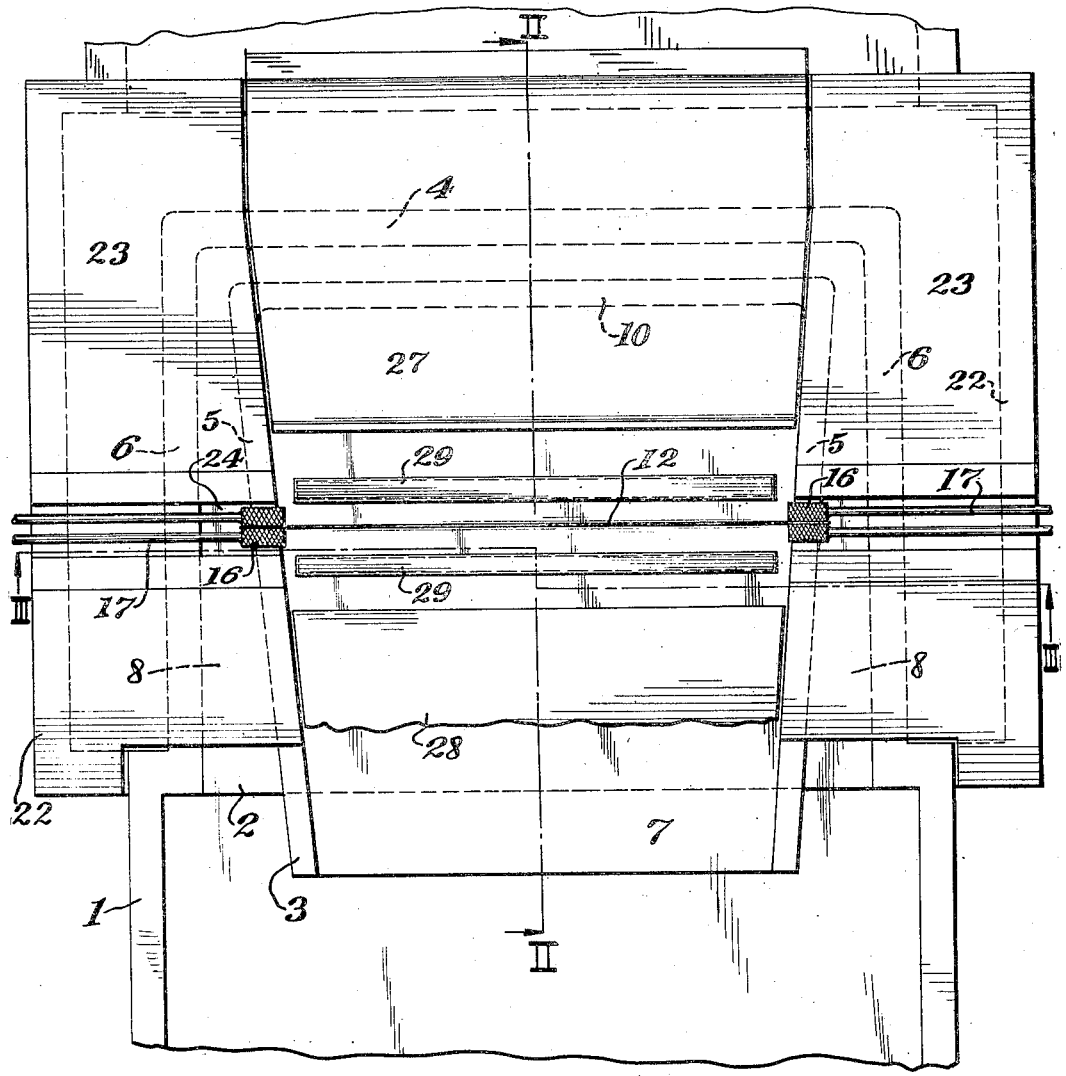
FIG-1-
INVENTOR
Lawrence A. Grolemund
BY C. A. Rowley
ATTORNEY

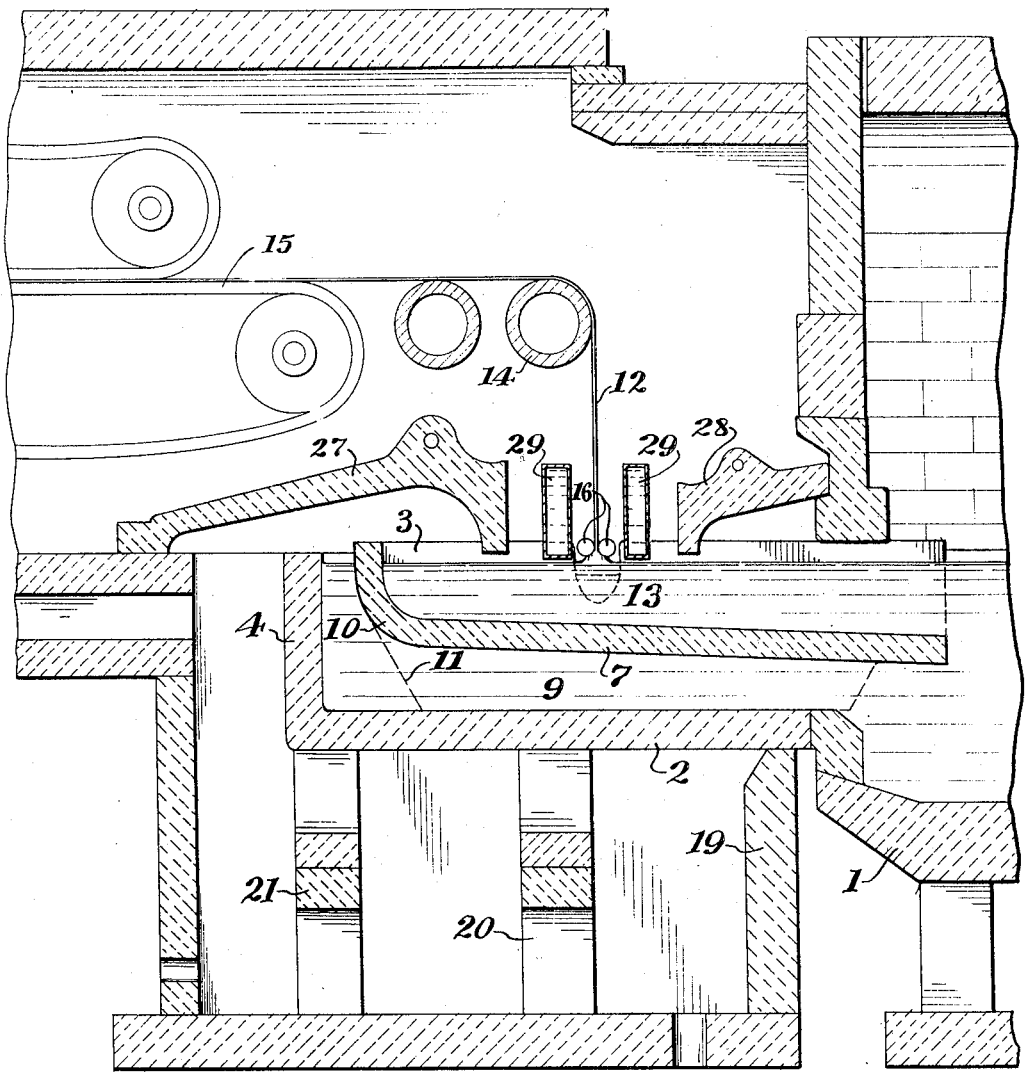
FIG-2-

Dec. 18, 1928.
L. A. GROLEMUND
1,695,547
DRAWING SHEET GLASS
Filed June 18, 1923    3 Sheets-Sheet 3
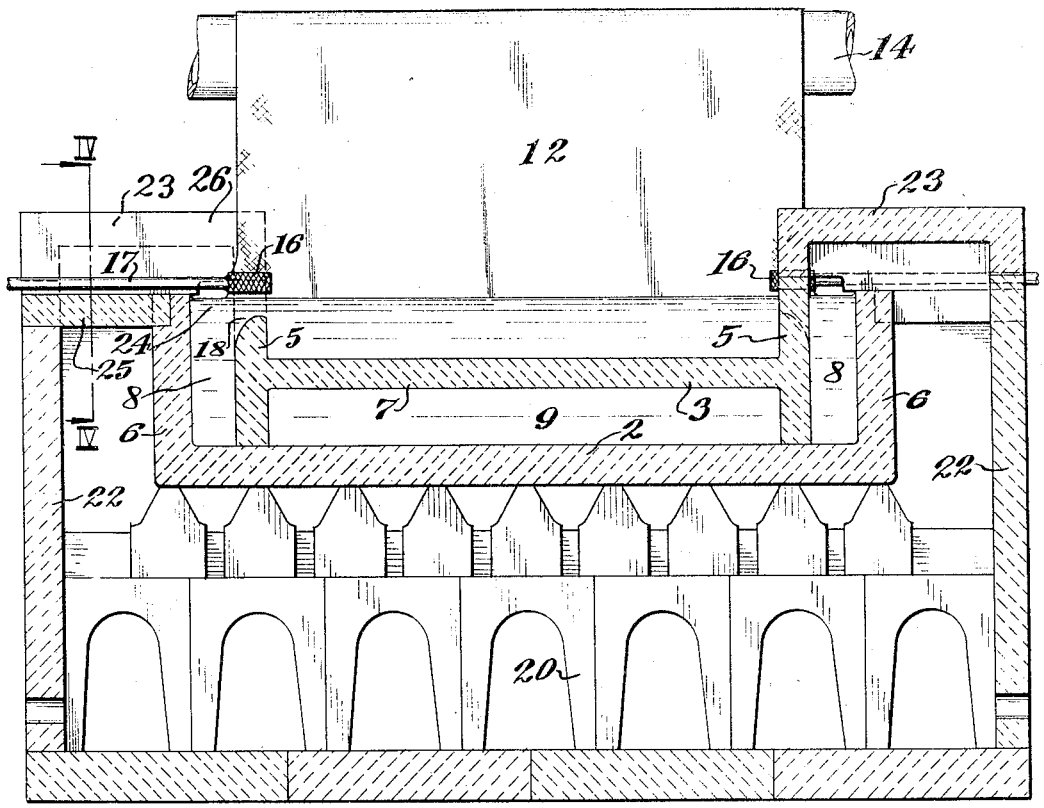
FIG-3-
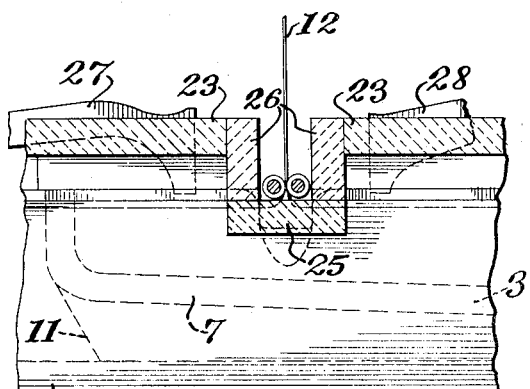
FIG-4-
INVENTOR
Lawrence A. Grolemund
BY C. A. Rowley
ATTORNEY Patented Dec. 18, 1928.

1,695,547

UNITED STATES PATENT OFFICE.

LAWRENCE A. GROLEMUND, OF CHARLESTON, WEST VIRGINIA, ASSIGNOR TO THE LIBBEY-OWENS SHEET GLASS COMPANY, OF TOLEDO, OHIO, A CORPORATION OF OHIO.

DRAWING SHEET GLASS.

Application filed June 18, 1923. Serial No. 646,027.

This invention relates to improvements in the art of drawing sheet glass, and more particularly to an improved process and apparatus for delivering molten glass to the sheet source and maintaining this supply of molten glass in the proper working condition.

This invention is particularly designed for use with the Colburn process of drawing sheet glass, as disclosed for example in the patent to Colburn, 1,248,809, granted Dec. 4, 1917, although many of its features are equally adapted for use with other sheet drawing systems. In the Colburn process, the molten glass flows from a continuous tank furnace into a shallow draw-pot or container, and the sheet of glass is drawn upwardly from the surface of the pool of molten glass maintained in this receptacle. The draw-pot is substantially surrounded by a suitable heating chamber or furnace, which maintains the glass at the proper working temperature.

One object of the present invention is to provide a new form of receptacle or container for the molten glass from which the sheet is drawn. More specifically, this container comprises a pair of nested receptacles, both in open communication at one end with the tank furnace from which the supply of molten glass is obtained. The stream of molten glass flowing in from the supply tank is divided, the central portion which ordinarily contains the better conditioned glass flowing into the inner receptacle from which the main body of the sheet is drawn, and the side portions of the flow being diverted into the space between the two receptacles. Sometimes devitrified glass or "dog-metal", and other impurities, will accumulate in some portion of the tank furnace and this glass will usually become deflected along the side walls of the tank. Consequently, these objectionable elements in the glass will flow into the side channels between the two receptacles, and cannot be drawn into the main body portion of the sheet. The line of draw of the sheet is such that the edge portions of the sheet will be fed from the glass in these side channels between the inner and outer containers, but, since these edge portions of the sheet are ultimately discarded, it is immaterial that the glass of which they are formed is of a poorer quality than that used for the main body of the sheet.

A further object is to provide a draw-pot or container having a glass-receiving opening narrower than the drawn sheet, the side walls of the container diverging from this opening, so that the molten glass must flare out or spread after entering the container and before reaching the sheet source.

A further object of the invention is to surround the receptacle for the pool of glass from which the main body of the sheet is drawn with a mass of highly heated molten glass, whereby the pool of glass may be maintained in a more uniform homogeneous condition due to the diffusion of the heat units passing through this outer casing of molten glass from the heating chamber which surrounds the nested receptacles.

The invention will be better understood from the following detailed description of one approved design of apparatus embodying the principles of this invention.

In the accompanying drawings:

Fig. 1 is a plan view of those portions of the structure adjacent the line of draw of the sheet.

Fig. 2 is a longitudinal vertical section taken substantially on the line II—II of Fig. 1.

Fig. 3 is a transverse vertical section taken sustantially on the line III—III of Fig. 1.

Fig. 4 is a vertical section taken substantially on the line IV—IV of Fig. 3.

At 1 is indicated the end of the continuous tank furnace in which the molten glass is produced and from which it flows to the sheet drawing mechanism. This furnace is of considerable length and ordinarily comprises a melting chamber in which the glass-forming materials are fused, and one or more refining and cooling chambers through which the molten glass flows while it settles or cools to substantially the proper working condition. At 1 in the present drawings I have indicated merely the end of the so-called "cooling tank" from which the glass flows into the drawing receptacle.

In the present construction this draw-pot comprises a pair of nested receptacles 2 and 3. The outer receptacle 2 is closed at one end 4 and in open communication at the other end with the open end of cooling chamber 1. The inner container 3 comprises a pair of side walls 5 which are spaced from the side walls 6 of the outer container, and are supported at their lower edges upon the bottom of the outer container 2. Intermediate their top and bottom edges the side walls 5 are joined by a transverse wall 7 which forms the bottom of the inner receptacle 3. As best shown in Figs. 1 and 2, the front open end of the inner container formed by the wall 7 and the upper portions of the side walls 5 projects a certain distance into the end of cooling chamber 1, so that the flow of molten glass into the draw-pot will be divided before the side portions thereof actually enter the somewhat restricted open ends of the side passages 8 and bottom passage 9 between the inner and outer containers. The bottom wall 7 of the inner container 3 preferably slopes slightly upward from the open end of the container to the closed end where it is curved upwardly as indicated at 10, Fig. 2, to aid the circulation of the substratum glass which flows below the sheet source to the closed end 10 of the container, and thence returns to be drawn into the rear face of sheet 12. The side walls 5 of the inner container converge from the closed end 10 to the open entrance end of the container as indicated in Fig. 1, and for reasons that will be noted hereinafter. The rear ends of side walls 5 of the inner container are cut away as at 11 to allow free communication between the lower passage 9 and the side passages 8 at the closed end of the pot. The glass sheet 12 is drawn upwardly from the pool of molten glass 13 in the inner receptacle, deflected over the bending member 14, and carried away through a suitable drawing and flattening mechanism 15, all as described in detail in the Colburn patent hereinabove referred to. The edge portions of the sheet are drawn up between pairs of edge-forming rollers 16, which are separately driven at a slower peripheral speed than the speed of draw of the sheet as more fully explained in the above-mentioned Colburn patent. These edge-forming rollers 16, which are carried at the inner ends of suitable driven shafts 17 are located substantially over the upper edges of side walls 5 of the inner container, which walls are suitably cut away directly below these rollers as at 18 to facilitate the passage of molten glass from the side channels 8 up through rollers 16 into the edge portions of the sheet.

The draw-pot is supported adjacent its open front end upon the rear wall 19 of the heating chamber below the pot, and the forward portions of the draw-pot are supported upon rows of open-arched stools 20 and 21 within the heating chamber. The side walls 22 of the heating chamber are spaced beyond the side walls of outer container 2 and are joined, above the level of these side walls, to the upper edges of side walls 5 of the inner container by arched cover plates 23. In this way, the side portions of the heating chamber are carried completely around the outer container 2 so as to cover the side passages 8 between the two containers.

The arched cover members 23 are cut away adjacent the line of draw of the sheet to provide a passage for the shafts 17 of edge-rollers 16 and also to leave exposed areas 24 of the molten glass in the side passages 8 from which the edge portions of the sheet are drawn. A cover plate 25 and side walls 26 close the gaps where the cover plates 23 are cut away so to prevent the undue loss of heat at these places from the heating chamber.

Cover tiles 27 and 28 enclose all of the surface glass of pool 13 in the inner container 3 except a limited area at either side of the line of formation of sheet 12. A pair of cooling members 29 are arranged over this exposed area of the molten pool adjacent the sides of the sheet 12 to accelerate the cooling of this surface glass, and permit a more rapid drawing rate for the sheet. It will be noted that the molten glass in the draw-pot, both in the inner and outer receptacles is almost completely enclosed except for the small area adjacent the line of sheet formation.

Sometimes, due to various causes, devitrified glass or other impurities will accumulate to some extent in portions of the glass tank, and these impurities will, after flowing into the draw-pot, in various ways cause blemishes and imperfections in the draw sheet of glass. Usually these objectionable materials will form along the sides of the tank or will be diverted there by the currents of flowing glass. As the glass enters the deeper draw-pot, above described, these impurities, if any, will flow into the wider open ends of side channels 8 between the inner and outer containers. The flow of glass into the inner container 3 will be drawn entirely from the central portion of the glass in the tank which is ordinarily in a much better condition than that adjacent the side walls. Sufficient heat will be supplied from the heating chamber surrounding the outer container to maintain this molten glass which flows into passages 8 and 9 in a highly heated condition, and portions of this heat will be transmitted in an evenly distributed manner through the walls of inner container 3 to the pool of molten glass 13 in the inner receptacle, thus maintaining this inner pool in an ideal condition for being drawn into sheet form. Enough glass is drawn up from the outer passages 8 through the edge-forming rollers 16 into the edge portions of the sheet to provide a slow but constant circulation of molten glass in passages 8 and 9 to prevent the stagnation of this glass.

As noted above, the open entrance to inner container 3 is considerably narrower than that portion of the receptacle from which the sheet is drawn. In this way, the flow of glass into receptacle 3 must spread out or expand before it reaches the sheet source, and this spreading action will tend to blend any hot and cold streaks that may be present in this stream of glass and thus eliminate one main cause of striations or waves in the drawn sheet.

Claims:

1. In a sheet glass drawing apparatus, a source of molten glass, a container having partition walls defining a wide central passage and a pair of narrower side passages, all of the passages being in open communication with the source of molten glass, and means for simultaneously drawing the main body of the sheet from the central passage and the edge portions of the sheet from the side passages.

2. In a sheet glass drawing apparatus, a container for the molten pool from which the sheet is drawn, the container being closed at one end and in open communication at the other end with a source of molten glass, the open end being narrower than the closed end and the side walls converging from the wider closed end to the narrower open end.

3. In a sheet glass drawing apparatus, an inner container for a pool of molten glass from which the sheet is drawn, and an outer container surrounding the bottom and side walls of the inner container but spaced therefrom, the space between the containers being filled with molten glass, and a heating chamber surrounding the bottom and side walls of the outer container, the sides of one of the containers being closer to the sides of the other container at their closed ends than at their open ends.

4. In a sheet glass drawing apparatus, an inner container for a pool of molten glass from which the sheet is drawn, and an outer container surrounding the bottom and side walls of the inner container but spaced therefrom, the sides of one of the containers being closer to the sides of the other container at their closed ends than at their open ends, the space between the inner containers being filled with molten glass, and a heating chamber so surrounding the containers that the only molten glass not directly heated from the chamber is that portion of the upper exposed surface of the pool from which the sheet is drawn.

5. In a sheet glass drawing apparatus, an inner container for a pool of molten glass from which the sheet is drawn, and an outer container surrounding the bottom and side walls of the inner container but spaced therefrom, the space between the containers being filled with molten glass, and a heating chamber surrounding the bottom and side walls of the outer container, the sides of the inner container being closer to the sides of the outer container at their closed ends than at their open ends.

6. In sheet glass apparatus, an inner container for a mass of molten glass from which the sheet is drawn, and an outer container surrounding the bottom and side walls of the inner container and spaced therefrom, both containers being in open communication at one end with a source of molten glass, said sheet being drawn from a point intermediate the ends of the inner container.

7. In sheet glass apparatus, an inner container for a mass of molten glass from which the sheet is drawn, and an outer container surrounding the bottom and side walls of the inner container and spaced therefrom, both containers being in open communication at one end with a source of molten glass, said sheet being drawn from a point intermediate the ends of the inner container, the sides of one of the containers being closer to the sides of the other container at their closed ends than at their open ends.

8. In sheet glass apparatus, an inner container for a mass of molten glass from which the sheet is drawn, and an outer container surrounding the bottom and side walls of the inner container and spaced therefrom, both containers being in open communication at one end with a source of molten glass, said sheet being drawn from a point intermediate the ends of the inner container, the sides of the inner container being closer to the sides of the outer container at their closed ends than at their open ends.

9. In sheet glass apparatus, an inner container for a mass of molten glass from which the sheet is drawn, and an outer container surrounding the bottom and side walls of the inner container and spaced therefrom, both containers being in open communication at one end with a source of molten glass, the two containers communicating at the drawing point through cutaway portions in the walls of the inner container.

10. In sheet glass apparatus, an inner container for a mass of molten glass from which the sheet is drawn, and an outer container surrounding the bottom and side walls of the inner container and spaced therefrom, both containers being in open communication at one end with a source of molten glass, the two containers communicating at the drawing point through cutaway portions in the walls of the inner container, said sheet being drawn from a point intermediate the ends of the inner container.

11. In sheet glass apparatus, an inner container for a mass of molten glass from which the sheet is drawn, and an outer container surrounding the bottom and side walls of the inner container and spaced therefrom, both containers being in open communication at one end with a source of molten glass, the two containers communicating at the drawing point through cutaway portions in the walls of the inner container, said sheet being drawn from a point intermediate the ends of the inner container, the sides of the inner container being closer to the sides of the outer container at their closed ends than at their open ends.

Signed at Charleston, in the county of Kanawha, and State of West Virginia, this 11th day of June 1923.

LAWRENCE A. GROLEMUND.